(12) United States Patent
Ilkawa et al.

(10) Patent No.: US 7,889,981 B2
(45) Date of Patent: Feb. 15, 2011

(54) WEATHER-SEALING STRUCTURE OF A LENS BARREL

(75) Inventors: Makoto Ilkawa, Saitama (JP); Takahiro Kobayashi, Saitama (JP)

(73) Assignee: Hoya Corporation, Tokyo (JP)

( * ) Notice: Subject to any disclaimer, the term of this patent is extended or adjusted under 35 U.S.C. 154(b) by 311 days.

(21) Appl. No.: 12/034,855

(22) Filed: Feb. 21, 2008

(65) Prior Publication Data

US 2008/0204878 A1    Aug. 28, 2008

(30) Foreign Application Priority Data

Feb. 22, 2007   (JP)   ............................. 2007-042780

(51) Int. Cl.
  *G03B 17/08* (2006.01)
(52) U.S. Cl. ........................................ 396/25; 359/513
(58) Field of Classification Search .................... 396/25, 396/29, 72, 349; 359/507, 508, 512, 513, 359/808; 348/81
  See application file for complete search history.

(56) References Cited

U.S. PATENT DOCUMENTS

| | | | |
|---|---|---|---|
| 4,821,043 A * | 4/1989 | Leavitt | ........................ 343/765 |
| 6,301,060 B1 | 10/2001 | Watanabe et al. | |
| 6,619,806 B2 | 9/2003 | Akami et al. | |
| 6,738,570 B2 * | 5/2004 | Shinohara et al. | .............. 396/25 |
| 7,625,140 B2 * | 12/2009 | Miya | ........................... 396/349 |
| 2004/0070849 A1 | 4/2004 | Tanaka | |
| 2004/0156181 A1 | 8/2004 | Nomura et al. | |
| 2006/0034595 A1 | 2/2006 | Yamazaki et al. | |
| 2007/0127910 A1 | 6/2007 | Miya | |
| 2007/0269204 A1 | 11/2007 | Miya et al. | |
| 2009/0008885 A1 * | 1/2009 | Kanagae et al. | ............. 277/650 |

FOREIGN PATENT DOCUMENTS

| | | |
|---|---|---|
| JP | 6-222422 | 8/1994 |
| JP | 2000-227534 | 8/2000 |
| JP | 2001-337257 | 12/2001 |
| JP | 2003-202481 | 7/2003 |

OTHER PUBLICATIONS

English language Abstract of JP 6-222422.
English language Abstract of JP 2003-202481.

* cited by examiner

*Primary Examiner*—Christopher E Mahoney
*Assistant Examiner*—Autumn Parker
(74) *Attorney, Agent, or Firm*—Greenblum & Bernstein P.L.C.

(57) ABSTRACT

A weather-sealing structure of a lens barrel includes an inner annular member and an outer annular member which are concentrically arranged to be movable relative to each other, and a water-repellent ring made of synthetic leather which is impregnated with a water repellent, one of two sides of the water-repellent ring being fixed to one of an inner peripheral surface of the outer annular member and an outer peripheral surface of the inner annular member. The other of the two sides of the water-repellent ring includes a hair-implanted surface including a large number of hairs which is in contact with the other of the inner peripheral surface of the outer annular member and the outer peripheral surface of the inner annular member to be slidable thereon.

19 Claims, 6 Drawing Sheets

WEATHER-SEALING STRUCTURE OF A LENS BARREL

BACKGROUND OF THE INVENTION

1. Field of the Invention

The present invention relates to a weather-sealing structure of a lens barrel which prevents water, dust and the like from entering inside the lens barrel via a gap between annular members of the lens barrel.

2. Description of the Prior Art

Lens barrels such as photographic lenses for use in cameras usually include a plurality of annular members which are concentrically arranged to be movable relative to each other along an optical axis and/or to be rotatable relative to each other about an optical axis. In the case where one of the plurality of annular members is either a hand-operated zoom ring or a hand-operated focus ring, so that manually rotating the zoom ring or the focus ring forward and reverse causes another annular member to move forward and rearward along the optical axis, it has been conventional practice to make adjacent annular members (which are overlaid radially) of the plurality of annular members produce friction therebetween intentionally so that the user can feel a moderate rotational resistance in the zoom ring or the focus ring when manually rotating the zoom ring or the focus ring.

As an example of a device which produces such a resistance, an annular friction member made of synthetic leather which is provided with fine and minute hairs implanted entirely into one of the radially outer and inner surfaces of the annular friction member is used, wherein the other of the radially outer and inner surfaces of the annular friction member is fixed to one of the radially adjacent surfaces (inner and outer peripheral surfaces) of the aforementioned adjacent annular members while the hair-implanted surface of the annular friction member is made to be in contact with the other of the radially adjacent surfaces of the aforementioned adjacent annular members to be slidable thereon.

However, although the lens barrel is configured so that the user can feel a moderate rotational resistance in the zoom ring or the focus ring if a synthetic leather member is adopted in this manner, it is difficult to prevent water, dust and the like from entering inside the lens barrel from a gap between the aforementioned adjacent annular members (i.e., to make the lens barrel weather-resistant).

A lens barrel which is constructed so that the user can feel a moderate rotational resistance in the zoom ring or the focus ring when manually rotating the zoom ring or the focus ring, while providing a weather-sealing structure, is known in the art, and an example of such a lens barrel is disclosed in Japanese unexamined patent publication 2000-227534 (hereinafter referred to as Patent Publication 1).

In the lens barrel disclosed in Patent Publication 1, annular washers 7 and 8 made of a material such as a plastic or polychloroethene sheet are inserted in between a rear end portion of an outer peripheral surface of a front exterior ring 3 and a front end portion of an inner peripheral surface of a manual operation ring 4 which is positioned immediately behind the front exterior ring 3 to be rotatable relative to the front exterior ring 3 about the optical axis (and to be prevented from moving in the optical axis direction relative to the front exterior ring 3), and annular washers 11 and 12 made of a material such as a plastic or polychloroethene sheet are inserted in between the rear end portion of the outer peripheral surface of the manual operation ring 4 and the front end portion of the inner peripheral surface of a rear exterior ring 9 which is positioned immediately behind the manual operation ring 4. Additionally, a water repellent is filled into a gap between the rear end portion of the outer peripheral surface of the front exterior ring 3 and the front end portion of the inner peripheral surface of the manual operation ring 4 to be positioned immediately behind the annular washers 7 and 8, and a water repellent is filled into a gap between the rear end portion of the outer peripheral surface of the manual operation ring 4 and the front end portion of the inner peripheral surface of the rear exterior ring 9 to be positioned immediately before the annular washers 11 and 12.

In the lens barrel disclosed in Patent Publication 1 that has the above described configuration, the annular washers 7, 8, 11 and 12 and the front and rear water repellents utilize the weather-sealing capabilities thereof, thus preventing water and dust from entering inside the lens barrel. Moreover, since the annular washers 7 and 8 are held between the front exterior ring 3 and the manual operation ring 4 while the annular washers 11 and 12 are held between the manual operation ring 4 and the rear exterior ring 9, the user can feel a moderate rotational resistance in the manual operation ring 4 when manually rotating the manual operation ring 4.

However, in the lens barrel disclosed in Patent Publication 1, since the annular washers 7, 8, 11 and 12 are formed of a relatively hard plastic or polychloroethene sheet, it is difficult to make the user feel a rotational resistance in the manual operation ring 4 in a manner similar to the manner in the case of adopting the aforementioned friction member made of synthetic leather. Specifically, in the case where an annular member rotates about an optical axis while sliding along the optical axis, it is more difficult to make the user feel a rotational resistance in a manual operation ring (such as the manual operation ring 4) in a manner similar to the manner in the case of adopting the aforementioned friction member made of synthetic leather than the case where an annular member only slides along an optical axis or only rotates about an optical axis.

Additionally, since the annular washers 7, 8, 11 and 12 are made of a relatively hard plastic or polychloroethene sheet, if minute knurls (pits and projections) exist on surfaces of the annular washers 7, 8, 11 and 12, there is a possibility that the manual operation ring 4 may not be manually rotated smoothly due to the influence of such minute knurls. Accordingly, the annular washers 7, 8, 11 and 12 need to be formed precisely with specification requirements; however, it is difficult to form the annular washers 7, 8, 11 and 12 out of a relatively hard plastic or polychloroethene sheet precisely.

SUMMARY OF THE INVENTION

The present invention provides a weather-sealing structure of a lens barrel, wherein, when manually rotating an annular member of the lens barrel, the user can feel a moderate rotational resistance in the annular member while the weather-sealing structure of the lens barrel can utilize the weather-sealing capability thereof, and further wherein the weather-sealing structure of the lens barrel can be easily produced.

According to an aspect of the present invention, a weather-sealing structure of a lens barrel is provided, including at least an inner annular member and an outer annular member which are concentrically arranged to be movable relative to each other, and a water-repellent ring. The water-repellent ring is made of synthetic leather which is impregnated with a water repellent, one of two sides of the water-repellent ring being fixed to one of an inner peripheral surface of the outer annular member and an outer peripheral surface of the inner annular member, and the other of the two sides of the water-repellent ring includes a hair-implanted surface including a large number of hairs which is in contact with the other of the inner peripheral surface of the outer annular member and the outer peripheral surface of the inner annular member to be slidable thereon.

According to the present invention, when manually moving one of the inner and outer annular members relative to the other, the user can feel a moderate moving resistance in the one annular member since one of the two sides of the synthetic-leather-made water-repellent ring is fixed to one of the inner peripheral surface of the outer annular member and the outer peripheral surface of the inner annular member while the hair-implanted surface of the water-repellent ring is in contact with the other of the inner peripheral surface of the outer annular member and the outer peripheral surface of the inner annular member to be slidable thereon.

Moreover, since the material of the water-repellent ring, i.e., the synthetic leather, is impregnated with a water repellent, water, dust and the like can be prevented from entering the inside of the lens barrel in an effective manner.

Furthermore, since the material of the water-repellent ring, i.e., the synthetic leather, is a flexible material, the thicknesses of the water-repellent ring is not required to be so precise. Therefore, the water-repellent ring that serves as an element of the weather-sealing structure, according to the present invention, can be produced in an easier manner than the case where a weather-sealing member (annular sealing member) is produced out of a plastic sheet or a polychloroethene sheet in a conventional manner.

It is desirable for at least one of the inner annular member and the outer annular member to move along an optical axis while rotating about the optical axis.

According to this structure, even if one of the inner and outer annular members moves along the optical axis while rotating about the optical axis, the user can feel a moderate rotational resistance in the one annular member when manually rotating the one annular member.

It is desirable for the water-repellent ring to be opaque. Accordingly, the water-repellent ring can prevent ambient light from entering inside the lens barrel from a gap between the inner and outer annular members.

It is desirable for the water-repellent ring to be formed as a rolled strip having a length substantially identical to one of an inner circumference of the outer annular member and an outer circumference of the inner annular member to which the water-repellent ring is fixed. Accordingly, the water-repellent ring can be produced much more easily.

It is desirable for positions of front and rear ends of each end of the rolled strip of the water-repellent ring to be mutually different in a circumferential direction of the water-repellent ring.

According to this structure, the length of each circumferential end of the strip-shaped water-repellent ring becomes longer than that in the case where both end surfaces of the strip-shaped water-repellent ring are formed as simple straight end surfaces parallel to the optical axis direction of the lens barrel, i.e., orthogonal to the lengthwise direction (circumferential direction) of the water-repellent ring. Accordingly, even if a gap is created between both end surfaces of the water-repellent ring, it becomes difficult for water or moisture which enters the gap from one end thereof to reach the other end of the gap. Therefore, the water repellency of the water-repellent ring is improved as compared with the case where both end surfaces of the water-repellent ring in the shape of a strip are formed as simple straight end surfaces parallel to the optical axis direction of the lens barrel.

It is desirable for each end of the rolled strip to include a first edge which extends toward a rear edge of the strip from a front edge of the strip; a second edge which extends toward the front edge of the strip from the rear edge of the strip at a position different from a position of the first edge in the circumferential direction of the water-repellent ring; and a connecting portion which extends in a direction different from either of two directions in which the first edge and the second edge extend, respectively, and connects the first edge and the second edge to each other.

According to this structure, the length of each of both ends of the water-repellent ring in the shape of a strip in the circumferential direction thereof becomes much longer, which achieves further improvement in water repellency of the water-repellent ring.

It is desirable for the synthetic leather that is impregnated with the water repellent is shaped into a rolled strip to form the water-repellent ring.

It is desirable for the lens barrel to include a plurality of movable lens groups which are moved relative to each other along an optical axis to perform a zooming operation.

It is desirable for an annular recessed portion, in which the water-repellent ring is fitted to be fixed thereto, is formed in the one of the inner peripheral surface of the outer annular member and the outer peripheral surface of the inner annular member, to which the water-repellent ring is fixed.

It is desirable for the connecting portion to extend straight in the circumferential direction of the water-repellent ring.

It is desirable for the connecting portion to extend obliquely with respect to the circumferential direction of the water-repellent ring.

In an embodiment, a weather-sealing structure of a telescoping type of lens barrel is provided, including at least two radially-adjacent concentric barrels at least one of which moves relative to the other, and a water-repellent ring. The water-repellent ring made of synthetic leather which is impregnated with a water repellent and installed between radially-adjacent peripheral surfaces of the two radially-adjacent concentric barrels, fine hairs being densely implanted into one of inner and outer peripheral surfaces of the water-repellent ring. The other of the inner and outer peripheral surfaces of the water-repellent ring is fixed to one of the radially-adjacent peripheral surfaces of the two radially-adjacent concentric barrels so that the one of the inner and outer peripheral surfaces of the water-repellent ring, into which the fine hairs are implanted, is in sliding contact with the other of the radially-adjacent peripheral surfaces of the two radially-adjacent concentric barrels.

The present disclosure relates to subject matter contained in Japanese Patent Application No. 2007-42780 (filed on Feb. 22, 2007) which is expressly incorporated herein in its entirety.

BRIEF DESCRIPTION OF THE DRAWINGS

The present invention will be discussed below in detail with reference to the accompanying drawings, in which.

DESCRIPTION OF THE EMBODIMENTS

An embodiment of a weather-sealing structure of a lens barrel according to the present invention will be hereinafter discussed in detail with reference to FIGS. 1 through 5.

Firstly, the overall structure of the lens barrel 10 will be hereinafter discussed with reference to FIGS. 1 and 2.

Figure 1:
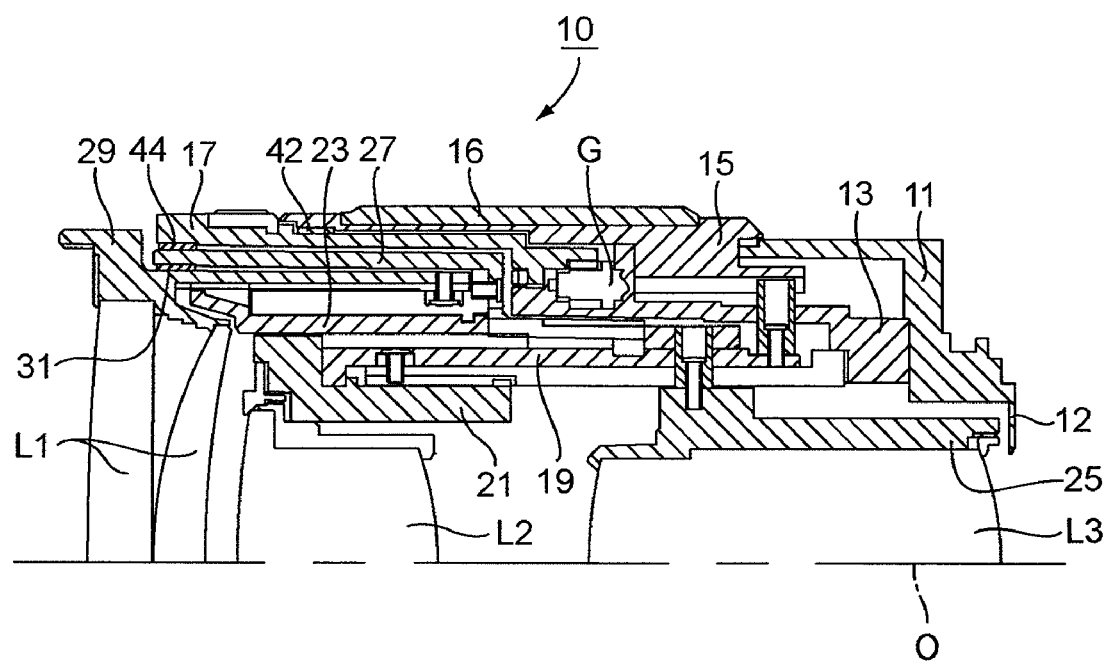
FIG. 1 is a longitudinal cross sectional view of an embodiment of a zoom lens barrel at the wide-angle extremity of the zooming range thereof, according to the present invention, showing only an upper half of the zoom lens barrel.
Figure 2:
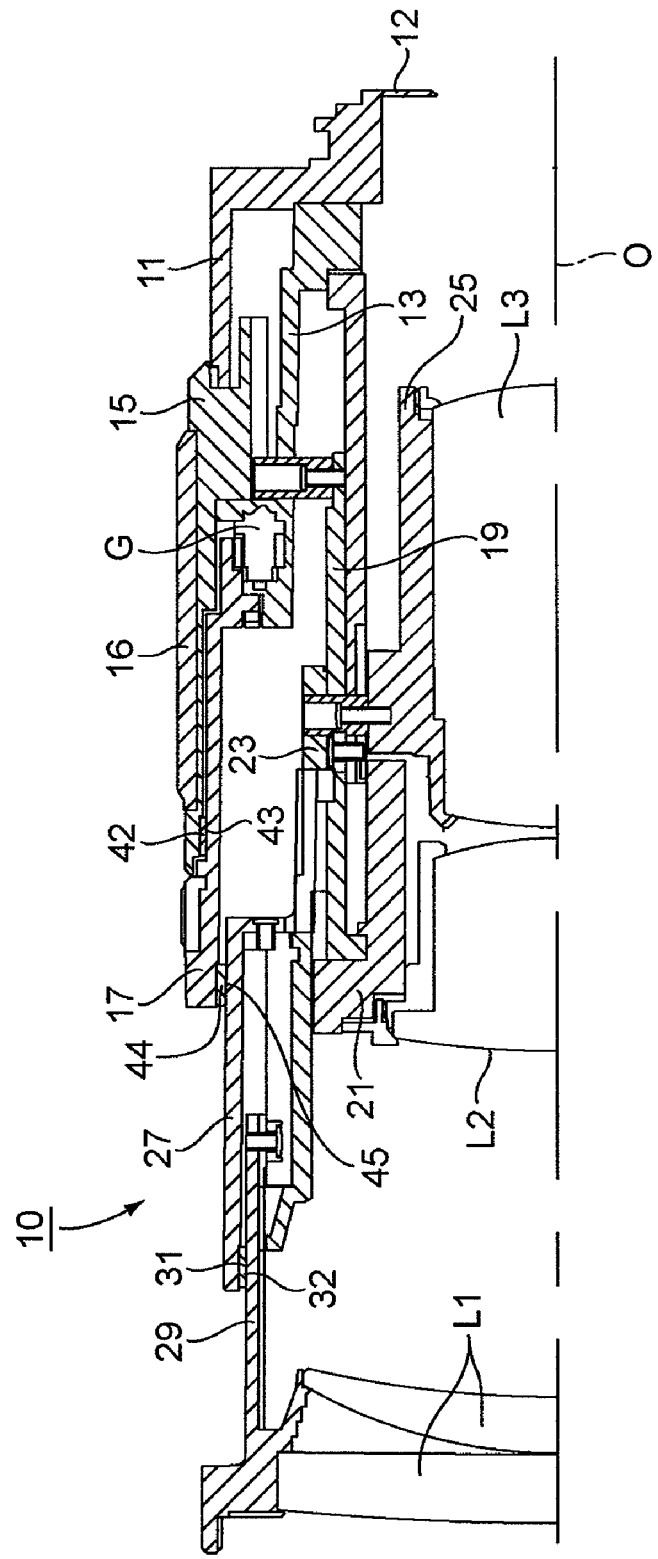
FIG. 2 is a view similar to that of FIG. 1, showing the zoom lens barrel at the telephoto extremity of the zooming range thereof.

As shown in FIGS. 1 and 2, the lens barrel 10 is an interchangeable type of photographic lens including three lens groups L1, L2 and L3. The lens barrel 10 is provided with a first stationary barrel 11 in the shape of a hollow cylinder, the axis of which is coincident with an optical axis O of the three lens groups L1, L2 and L3. The first stationary barrel 11 is provided at the rear end thereof with a ring-shaped mount portion 12 which is detachably attached to a ring-shaped mount portion of a camera body (not shown). The lens barrel 10 is further provided inside the first stationary barrel 11 with a second stationary barrel 13, in the shape of a hollow cylinder which is concentric with the first stationary barrel 11. The rear end of the second stationary barrel 13 is fixed to the front of a rear wall of the first stationary barrel 11.

The lens barrel 10 is provided, in between the front end of the first stationary barrel 11 and the front end of the second stationary barrel 13, with a hand-operated zoom ring 15. The hand-operated zoom ring 15 is in the shape of a hollow cylinder which is concentric with both the first stationary barrel 11 and the second stationary barrel 13 and capable of rotating about the optical axis O (but incapable of sliding along the optical axis O). A grip ring 16 is fixedly fitted on an outer peripheral surface of the zoom ring 15.

The lens barrel 10 is provided, around a front end portion of the second stationary barrel 13 between the second stationary barrel 13 and the zoom ring 15, with a focus ring 17 in the shape of a hollow cylinder which is concentric with the second stationary barrel 13 and capable of rotating about the optical axis O (but incapable of sliding along the optical axis O). The rear end of the focus ring 17 is positioned inside of the zoom ring 15. The focus ring 17 is provided, on an inner peripheral surface of a rear end portion of the focus ring 17, with an inner circumferential gear which meshes with an output gear G which is rotatably supported on the second stationary barrel 13 in the vicinity of the front end of the outer periphery thereof and positioned between the focus ring 17 and the second stationary barrel 13. The output gear G is shaped into a rod parallel to the optical axis O to be rotatable on an axis of rotation extending parallel to the optical axis O. The output gear G is linked with a focusing motor (not shown) provided in the camera body via a gear system provided in the camera body when the lens barrel 10 is attached to the camera body.

The lens barrel 10 is provided inside the second stationary barrel 13 with a cam ring 19 in the shape of a hollow cylinder which is concentric with the second stationary barrel 13. The cam ring 19 is linked with the zoom ring 15 via a power transmission mechanism (not shown). Therefore, forward and reverse rotations of the zoom ring 15 cause the cam ring 19 to move forward and rearward along the optical axis O while rotating about the optical axis O via the power transmission mechanism. The cam ring 19 supports a second-lens-group support frame 21 which is positioned inside the cam ring 19. The second-lens-group support frame 21 is an element for supporting the second lens group L2 that serves as a focusing lens group. The second-lens-group support frame 21 is guided linearly in the optical axis direction by a linear guide mechanism (not shown). Therefore, forward and reverse rotations of the zoom ring 15 cause the second support frame 21 to move with the cam ring 19 forward and rearward along the optical axis O without rotating about the optical axis O.

The lens barrel 10 is provided on the outer peripheral surface of the cam ring 19 with a linear guide ring 23 in the shape of a hollow cylinder which is concentric with the cam ring 19. The linear guide ring 23 is linked with the cam ring 19 via a linear guide mechanism and a power transmission mechanism (both not shown). Accordingly, forward and reverse rotations of the zoom ring 15 cause the linear guide ring 23 to move linearly along the optical axis O relative to the cam ring 19 while being prevented from rotating about the optical axis O. Additionally, the linear guide ring 23 supports a third-lens-group support frame 25 which is positioned inside of the linear guide ring 23 to support the third lens group L3. Therefore, forward and reverse rotations of the zoom ring 15 cause the third-lens-group support frame 25 to move with the linear guide ring 23 forward and rearward along the optical axis O.

The lens barrel 10 is provided on the outer peripheral surface of the linear guide ring 23 with a rotatable/extendable barrel 27 in the shape of a hollow cylinder which is concentric with the linear guide ring 23. The rotatable/extendable barrel 27 is linked with the cam ring 19 via a power transmission mechanism (not shown) and is prevented from moving along the optical axis O relative to the linear guide ring 23. Therefore, if the cam ring 19 moves forward and rearward along the optical axis O while rotating as the zoom ring 15 rotates, the rotatable/extendable barrel 27 moves forward and rearward with the linear guide ring 23 along the optical axis O while rotating relative to the cam ring 19.

In addition, the lens barrel 10 is provided between the linear guide ring 23 and the rotatable/extendable barrel 27 with a first-lens-group support frame 29 in the shape of a hollow cylinder which is concentric with both the linear guide ring 23 and the rotatable/extendable barrel 27 and which supports the first lens group L1. The first-lens-group support frame 29 is guided linearly in the optical axis direction by a linear guide mechanism (not shown) and linked with the rotatable/extendable barrel 27 via a power transmission mechanism (not shown). Therefore, manually rotating the zoom ring 15 causes the first-lens-group support frame 29 to move along the optical axis O relative to the linear guide ring 23 and the rotatable/extendable barrel 27 while being prevented from rotating.

The weather-sealing structure of the lens barrel 10 is provided between the zoom ring 15 and the focus ring 17 with a first weather-sealing structure, provided between the rotatable/extendable barrel 17 and the first-lens-group support frame 27 with a second weather-sealing structure, and provided between the first-lens-group support frame 27 and the first-lens-group support frame 29 with a third weather-sealing structure.

Firstly, the third weather-sealing structure that is provided between the rotatable/extendable barrel 27 and the first-lens-group support frame 29 will be discussed hereafter.

Figure 3:
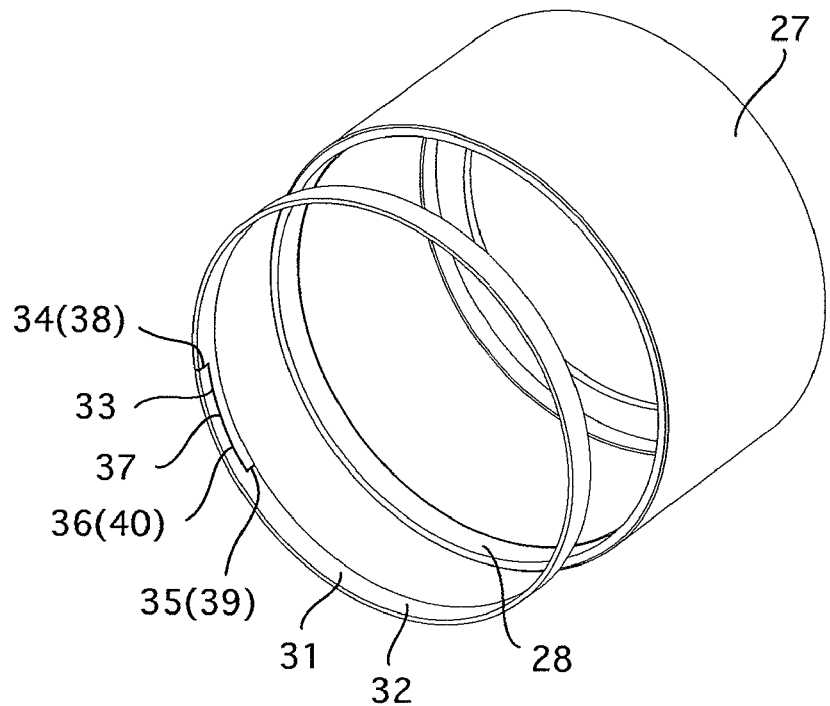
FIG. 3 is an exploded front perspective view of a portion of the zoom lens barrel, showing a rotatable-extendable barrel and a weather-sealing cloth ring.
Figure 4:
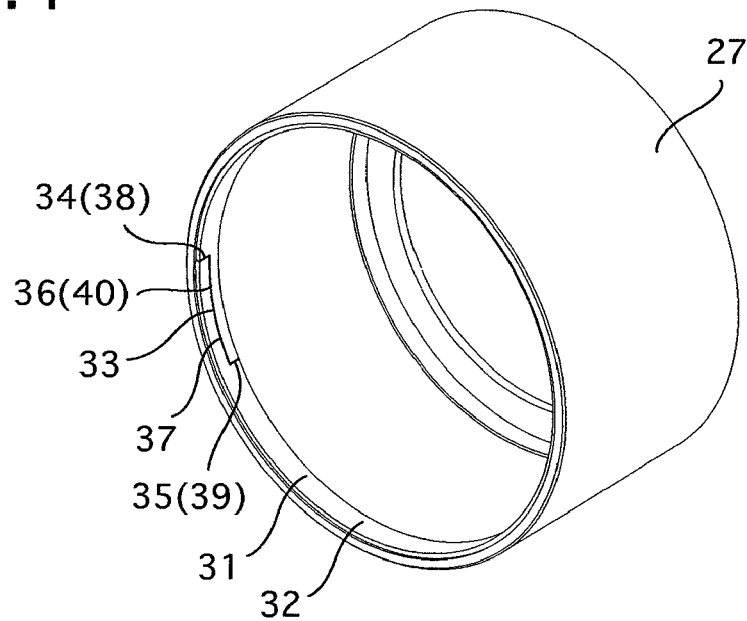
FIG. 4 is a front perspective view of the portion of the zoom lens barrel shown in FIG. 3, showing a state where the weather-sealing cloth is bonded in place in the rotatable-extendable barrel.

As shown in FIGS. 3 and 4, the rotatable/extendable barrel 27 is provided on the front end of an inner peripheral surface thereof with an annular recessed portion 28, and a ring-shaped weather-sealing cloth (water-repellent ring) 31 with the axis thereof on the optical axis O is fitted in the annular recessed portion 28 to be fixed thereto; i.e., the outer peripheral surface of the weather-sealing cloth 31 is bonded to the annular recessed portion 28.

The weather-sealing cloth 31 is made of opaque synthetic leather, and a large number of fine and minute hairs are densely implanted into the entire inner peripheral surface of the weather-sealing cloth 31 to form a hair-implanted surface 32. The weather-sealing cloth 31 is made of a synthetic leather strip which is cut from synthetic leather cloth to have a length substantially the same as the inner circumference of the rotatable/extendable barrel 27. Both end surfaces (both ends/both end edges) 33 and 37 of the synthetic leather strip that is cut from synthetic leather cloth are made to face each other when the synthetic leather strip is shaped into a ring. The weather-sealing cloth 31 is immersed in a water repellent (water-repellent solution) filled in a container (not shown) before being shaped into a ring, so that the weather-sealing cloth 31 is impregnated with the water repellent.

Figure 5:
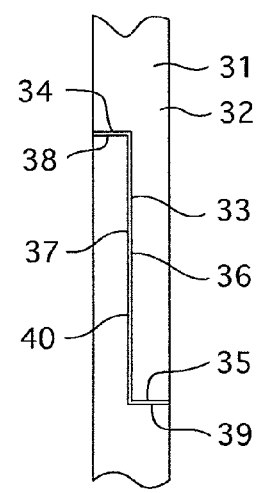
FIG. 5 is an enlarged developed view of a junction of both ends of the first embodiment of the weather-sealing cloth.

As shown in FIGS. 3, 4 and 5, the end surfaces 33 and 37 of the weather-sealing cloth 31 do not constitute simple cut surfaces extending orthogonal to the lengthwise (circumferential) direction of the weather-sealing cloth 31. Namely, the end surfaces 33 and 37 of the weather-sealing cloth 31 are provided with axial straight portions (first edges) 34 and 38, axial straight portions (second edges) 35 and 39, and circumferential straight portions (connecting portions) 36 and 40, respectively. The axial straight portions 34 and 38 extend linearly in the optical axis direction from the front edge (left edge as viewed in FIG. 5) of the weather-sealing cloth 31. The axial straight portions 35 and 39 extend linearly in the optical axis direction from the rear edge (right edge as viewed in FIG. 5) of the weather-sealing cloth 31. The circumferential straight portion 36 extends straight in a circumferential direction about the optical axis O and connects the rear end of the axial straight portion 34 and the front end of the axial straight portion 35 to each other, and the circumferential straight portion 37 extends straight in a circumferential direction about the optical axis O and connects the rear end of the axial straight portion 38 and the front end of the axial straight portion 39 to each other. The positions of the rear end of the axial straight portion 34 and the front end of the axial straight portion 35 in the optical axis direction are the same, and the positions of the rear end of the axial straight portion 38 and the front end of the axial straight portion 39 in the optical axis direction are the same. Since the weather-sealing cloth 31 is shaped so that the rear end of the axial straight portion 34 and the front end of the axial straight portion 35, which are mutually different in circumferential position, are connected to each other by the circumferential straight portion 36 and so that the rear end of the axial straight portion 38 and the front end of the axial straight portion 39, which are mutually different in circumferential position, are connected to each other by the circumferential straight portion 40 as described above, each of the end surfaces 33 and 37 is greater in cut surface area (in cutting length) than that in the case where both end surfaces of the weather-sealing cloth 31 are simple cut surfaces orthogonal to the lengthwise direction of the weather-sealing cloth 31.

As shown in FIGS. 1 and 2, the hair-implanted surface 32 of the weather-sealing cloth 31 is in contact with an outer peripheral surface of the first-lens-group support frame 29 to be slidable thereon.

A weather-sealing cloth (water-repellent ring) 42 made of synthetic resin which is the same as the synthetic resin of the weather-sealing cloth 31 is bonded to the front end of the inner peripheral surface of the zoom ring 15 and a weather-sealing cloth (water-repellent ring) 44 made of synthetic resin which is the same as the synthetic resin of the weather-sealing cloth 31 is bonded to the front end of the inner peripheral surface of the focus ring 17. The length of the weather-sealing cloth 42 is substantially the same as the length of the inner circumference of the zoom ring 15 and the length of the weather-sealing cloth 44 is substantially the same as the length of the inner circumference of the focus ring 17. Fine and minute hairs are implanted into the entire inner peripheral surfaces of the weather-sealing cloths 42 and 44 to form hair-implanted surfaces 43 and 45, respectively, similar to the hair-implanted surface 32. Although not shown in the drawings, both end surfaces (both ends/both end edges) of the weather-sealing cloth 42 and both end surfaces (both ends/both end edges) of the weather-sealing cloth 44 are identical in cut shape to the end surfaces 33 and 37. Moreover, the weather-sealing cloths 42 and 44 are impregnated with a water repellent, similar to the weather-sealing cloth 31.

The hair-implanted surface 43 of the weather-sealing cloth 42 is in contact with an outer peripheral surface of the focus ring 17 to be slidable thereon. The hair-implanted surface 45 of the weather-sealing cloth 44 is in contact with an outer peripheral surface of the rotatable/extendable barrel 27 to be slidable thereon.

In the lens barrel 10 that has the above described structure, manually rotating the zoom ring 15 causes the first lens group L1, the second lens group L2 and the third lens group L3 to move along the optical axis O to perform a zooming operation.

Although the zoom ring 15 rotates relative to the focus ring 17 during the zooming operation, the user can feel a moderate rotational resistance in the zoom ring 15 when manually rotating the zoom ring 15 due to the sliding contact of the hair-implanted surface 43 of the weather-sealing cloth 42 with an outer peripheral surface of the focus ring 17.

Moreover, since the weather-sealing cloth 42 is impregnated with a water repellent, the water repellency thereof prevents water, dust and the like from entering inside the lens barrel 10 from a gap between the front end of the zoom ring 15 and the focus ring 17.

Additionally, manually rotating the zoom ring 15 causes the rotatable/extendable barrel 27 to move along the optical axis O while rotating about the optical axis O relative to the focus ring 17, and causes the hair-implanted surface 45 of the weather-sealing cloth 44 that is fixed to the focus ring 17 to slide on an outer peripheral surface of the rotatable/extendable barrel 27. Accordingly, due also to the sliding contact of the weather-sealing cloth 44 with the rotatable/extendable barrel 27, the user can feel a moderate rotational resistance in the zoom ring 15 when manually rotating the zoom ring 15. Moreover, the weather-sealing cloth 44 utilizes the water-repellent capability thereof between the focus ring 17 and the rotatable/extendable barrel 27.

Likewise, manually rotating the zoom ring 15 causes the first-lens-group support frame 29 to move in the optical axis direction relative to the rotatable/extendable barrel 27, and causes the hair-implanted surface 32 of the weather-sealing cloth 31 that is fixed to the rotatable/extendable barrel 27 to slide on an outer peripheral surface of the first-lens-group support frame 29. Accordingly, due also to the sliding contact of the weather-sealing cloth 31 with the first-lens-group support frame 29, the user can feel a moderate rotational resistance in the zoom ring 15 when manually rotating the zoom ring 15. Moreover, the weather-sealing cloth 31 utilizes the water-repellent capability thereof between the rotatable/extendable barrel 27 and the first-lens-group support frame 29.

As described above, according to the above illustrated embodiment of the weather-sealing structure of the lens barrel 10, the user can feel a rotational moderate resistance in the zoom ring 15 when manually rotating the zoom ring 15.

Specifically, manually rotating the zoom ring 15 causes the rotatable/extendable barrel 27 to move forward and rearward along the optical axis O while rotating relative to the focus ring 17 and the first-lens-group support frame 29; however, in the case where one of two radially-adjacent annular members (which corresponds to the rotatable/extendable barrel 27) moves forward and rearward along the optical axis O while rotating relative to the other radially-adjacent annular member (which corresponds to the focus ring 17 or the first-lens-group support frame 29) in this manner, it is difficult to cause a moderate rotational resistance between such two radially-adjacent annular members when one of them rotates relative to the other. However, with the use of the weather-sealing cloth 31 and the weather-sealing cloth 44 that are made of synthetic resin in the above illustrated embodiment of the weather-sealing structure, it is possible to cause a moderate rotational resistance between the rotatable/extendable barrel 27 and the focus ring 17 and a moderate rotational resistance between the rotatable/extendable barrel 27 and the first-lens-group support frame 29.

Moreover, water, dust and the like which may exist outside of the lens barrel 10 can be prevented from entering inside the lens barrel 10 in an effective manner since each of the weather-sealing cloths 31, 42 and 44 is impregnated with a water repellent.

The weather-sealing cloths 31, 42 and 44 are made of a flexible material, and accordingly, the thicknesses of the weather-sealing cloths 31, 42 and 44 are not severely required to be as precise as in the case where a weather-sealing member is produced out of a plastic sheet or a polychloroethene sheet in a conventional manner. Hence, the weather-sealing cloths 31, 42 and 44 can be produced in an easier manner than before.

In addition, the weather-sealing cloths 31, 42 and 44 can be made by cutting a cloth of synthetic leather in strips and thereafter rounding the strips into rings; in this respect also, the weather-sealing cloths 31, 42 and 44 can be produced in an easy manner.

Moreover, since the weather-sealing cloths 31, 42 and 44 are made of opaque synthetic leather, ambient light is prevented from entering inside the lens barrel 10 from a gap between the zoom ring 15 and the focus ring 17, from a gap between the focus ring 17 and the rotatable/extendable barrel 27, and from a gap between the rotatable/extendable barrel 27 and the first-lens-group support frame 29.

Furthermore, both ends of each of the weather-sealing cloths 31, 42 and 44 are not cut into simple straight ends orthogonal to the lengthwise direction of the weather-sealing cloth but are cut into non-straight ends having complicated cut shapes so as to secure a long cutting length. Therefore, even if water enters a gap between the end surfaces 33 and 37 of the weather-sealing cloth 31 from the front ends of the axial straight portions 34 and 38, the chances of the water reaching the rear ends of the axial straight portions 35 and 39 are slim. Therefore, the weather-sealing structure shown in FIG. 5 is greater in water repellency than that in the case where both ends of each of the weather-sealing cloths 31, 42 and 44 are cut into simple straight ends orthogonal to the lengthwise direction of the weather-sealing cloth.

Although the present invention has been described based on the above illustrated embodiment of the weather-sealing structure of the lens barrel 10, the present invention is not limited solely to the above illustrated embodiment of the weather-sealing structure of the lens barrel 10; making various modifications to the weather-sealing structure is possible.

Figure 6:
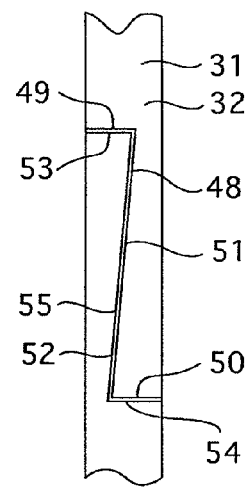
FIG. 6 is a view similar to that of FIG. 5, showing the second embodiment of the weather-sealing cloth.
Figure 7:
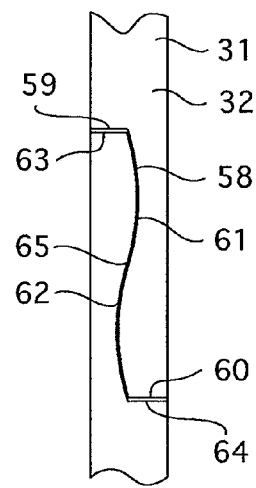
FIG. 7 is a view similar to that of FIG. 5, showing the third embodiment of the weather-sealing cloth.

For instance, the cut shapes of both ends of each weather-sealing cloth (31, 42 and 44) can be modified as shown in FIG. 6 or 7.

FIGS. 6 and 7 show the second embodiment of the weather-sealing cloth 31 and the third embodiment of the weather-sealing cloth 31, respectively.

In the weather-sealing cloth 31 shown in FIG. 6, both end surfaces (both ends/both end edges) 48 and 52 of the weather-sealing cloth 31 are provided with axial straight portions 49 and 53, axial straight portions 50 and 54 and circumferentially inclined straight portions 51 and 55, which correspond to the axial straight portions 34 and 38, the axial straight portions 35 and 39 and the circumferential straight portions 36 and 40 of the weather-sealing cloth 31 shown in FIG. 5, respectively. Since the positions of the rear end of the axial straight portion 49 and the front end of the axial straight portion 50 in the optical axis direction are mutually different and the positions of the rear end of the axial straight portion 53 and the front end of the axial straight portion 54 in the optical axis direction are mutually different, the circumferentially inclined straight portions 51 and 55 extend in a direction inclined to the circumferential (lengthwise) direction (which is orthogonal to the optical axis direction) of the weather-sealing cloth 31. The end surfaces 48 and 52 of the weather-sealing cloth 31 shown in FIG. 6 that have such shapes are greater in cutting length than the end surfaces 33 and 37 of the weather-sealing cloth 31 shown in FIG. 5, and therefore the weather-sealing cloth 31 shown in FIG. 6 is greater in water repellency than the weather-sealing cloth 31 shown in FIG. 5.

On the other hand, in the weather-sealing cloth 31 shown in FIG. 7, both end surfaces (both ends/both end edges) 58 and 62 of the weather-sealing cloth 31 are provided with axial straight portions 59 and 63, axial straight portions 60 and 64 and circumferential curved portions 61 and 65 which correspond to the axial straight portions 34 and 38, the axial straight portions 35 and 39 and the circumferential straight portions 36 and 40 of the weather-sealing cloth 31 shown in FIG. 5, respectively. The positions of the rear end of the axial straight portion 59 and the front end of the axial straight portion 60 are the same in the optical axis direction, the positions of the rear end of the axial straight portion 63 and the front end of the axial straight portion 64 are the same in the optical axis direction, and the circumferential curved portions 61 and 65 are curved (shaped like a letter S), not straight. Because the end surfaces 58 and 62 of the weather-sealing cloth 31 shown in FIG. 7 that have such shapes include the circumferential curved portions 61 and 65 that are curved as shown in FIG. 7, the end surfaces 58 and 62 of the weather-sealing cloth 31 shown in FIG. 7 are greater in cutting length than the end surfaces 33 and 37 of the weather-sealing cloth 31 shown in FIG. 5. Therefore, the weather-sealing cloth 31 shown in FIG. 7 is greater in water repellency than the weather-sealing cloth 31 shown in FIG. 5, similar to the weather-sealing cloth 31 shown in FIG. 6.

Figure 8:
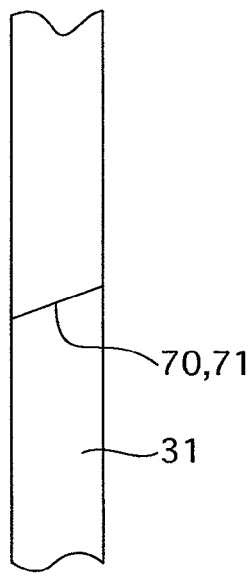
FIG. 8 is a view similar to that of FIG. 5, showing the fourth embodiment of the weather-sealing cloth.

The cut shapes of both ends of each weather-sealing cloth (31, 42 and 44) can be modified as shown in FIG. 8.

FIG. 8 shows the fourth embodiment of the weather-sealing cloth 31.

Both end surfaces (both ends/both end edges) 70 and 71 of the weather-sealing cloth 31 shown in FIG. 8 are straight in shape and inclined to the optical axis O. The end surfaces 70 and 71 of the weather-sealing cloth 31 shown in FIG. 8 that have such shapes are greater in cutting length than those in the case where both end surfaces of the weather-sealing cloth 31 are simple cut surfaces orthogonal to the lengthwise direction of the weather-sealing cloth 31. Therefore, the weather-sealing cloth 31 shown in FIG. 8 produces a greater water-repellent effect.

Figure 9:
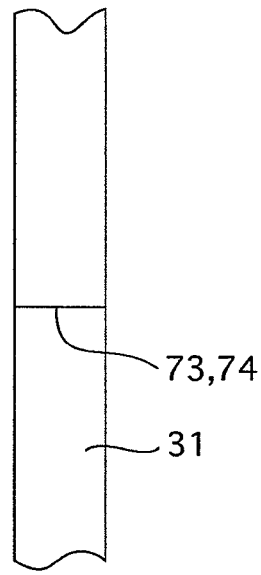
FIG. 9 is a view similar to that of FIG. 5, showing the fifth embodiment of the weather-sealing cloth.

FIG. 9 shows the fifth embodiment of the weather-sealing cloth 31. It is possible that both end surfaces 73 and 74 of the weather-sealing cloth 31 be straight cut surfaces orthogonal to the lengthwise direction of the weather-sealing cloth 31 as shown in FIG. 9 though the water-repellent effect deteriorates relatively to each of the above described first through third embodiments of the weather-sealing cloth 31.

Figure 10:
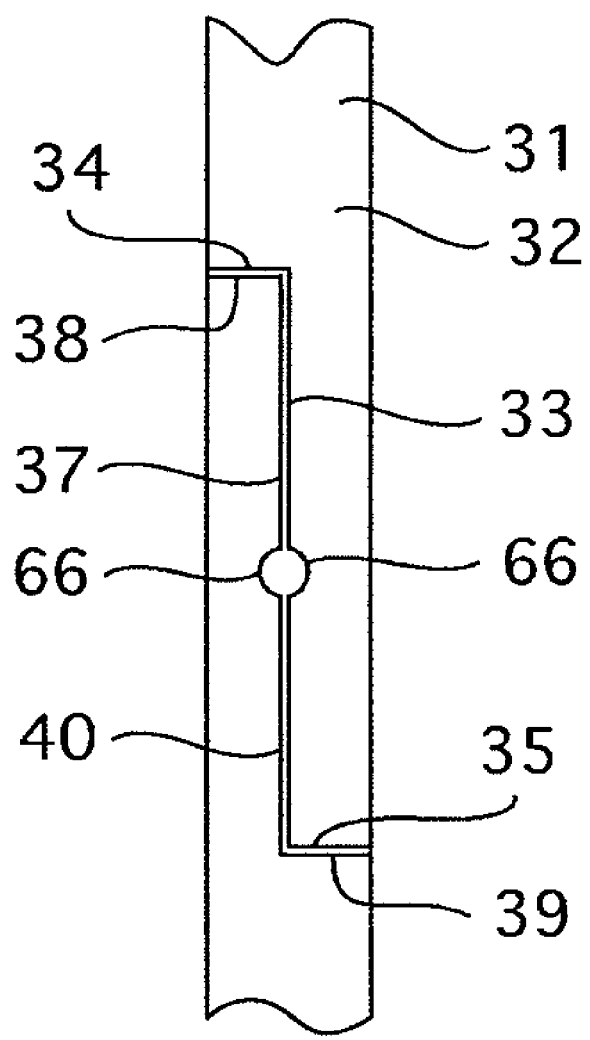
FIG. 10 is a view similar to that of FIG. 5, showing the sixth embodiment of the weather-sealing cloth.

FIG. 10 shows the sixth embodiment of the weather-sealing cloth 31.

As shown in FIG. 10, a water trap 66 can be formed at midpoint between the end surfaces 33 and 37 of the weather-sealing cloth 31. With this structure, water which enters a gap between the end surfaces 33 and 37 of the weather-sealing cloth 31 from the front ends of the axial straight portions 34 and 38 can be prevented from reaching the rear ends of the axial straight portions 35 and 39 in a more effective manner than the weather-sealing cloth 31 shown in FIG. 5. Of course, it is possible that a water trap corresponding to the water trap 66 can be formed at a midpoint between the end surfaces 48 and 52 of the weather-sealing cloth 31 shown in FIG. 6 and be formed at a midpoint between the end surfaces 58 and 62 of the weather-sealing cloth 31 shown in FIG. 7.

Additionally, a water repellent can be filled into a gap between the end surfaces 33 and 37 of the weather-sealing cloth 31. Accordingly, water which enters a gap between the end surfaces 33 and 37 of the weather-sealing cloth 31 from the front ends of the axial straight portions 34 and 38 can be prevented from reaching the rear ends of the axial straight portions 35 and 39 in a more effective manner than the weather-sealing cloth 31 shown in FIG. 5. Of course, in a similar manner, it is possible that a water repellent can be filled into a gap between the end surfaces 48 and 52 of the weather-sealing cloth 31 shown in FIG. 6, a gap between the end surfaces 58 and 62 of the weather-sealing cloth 31 shown in FIG. 7, a gap between the end surfaces 70 and 71 of the weather-sealing cloth 31 shown in FIG. 8, and a gap between the end surfaces 73 and 74 of the weather-sealing cloth 31 shown in FIG. 9.

Although the weather-sealing cloths 42, 44 and 31 are installed between two annular members (the zoom ring 15 and the focus ring 17) which rotate relative to each other about the optical axis O (without moving relative to each other along the optical axis O), between two annular members (the focus ring 17 and the rotatable/extendable barrel 27) which move relative to each other along the optical axis O while rotating relative to each other about the optical axis O, and between two annular members (the rotatable/extendable barrel 27 and the first-lens-group support frame 29) which move relative to each other along the optical axis O while rotating relative to each other about the optical axis O, respectively, it is a matter of course that a weather-sealing cloth corresponding to each of the weather-sealing cloths 31, 42 and 44 can be installed between two annular members which move relative to each other along the optical axis (without rotating relative to each other about the optical axis).

In addition, the present invention can also be applied to a lens barrel in which at least one internal lens group is retracted in a direction transverse to the optical axis of the lens barrel when the lens barrel is not in use.

Additionally, it is possible that the inner peripheral surface of each weather-sealing cloth (31, 42 and 44) be bonded to an outer peripheral surface of the inner annular member of two radially-adjacent annular members and that fine and minute hairs be implanted into the outer peripheral surface of the weather-sealing cloth to form a hair-implanted surface so that the hair-implanted surface is in contact with an inner peripheral surface of the outer annular member of the two radially-adjacent annular members to be slidable thereon.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A weather-sealing structure of a lens barrel, comprising at least an inner annular member and an outer annular member which are concentrically arranged to be movable relative to each other, and a water-repellent ring;
   wherein said water-repellent ring comprises synthetic leather which is impregnated with a water repellent, one of two sides of said water-repellent ring being fixed to one of an inner peripheral surface of said outer annular member and an outer peripheral surface of said inner annular member, and
   wherein the other of said two sides of said water-repellent ring includes a hair-implanted surface including a large number of hairs which is in contact with the other of said inner peripheral surface of said outer annular member and said outer peripheral surface of said inner annular member to be slidable thereon.

2. The weather-sealing structure of a lens barrel according to claim 1, wherein at least one of said inner annular member and said outer annular member moves along an optical axis while rotating about said optical axis.

3. The weather-sealing structure of a lens barrel according to claim 1, wherein said water-repellent ring is opaque.

4. The weather-sealing structure of a lens barrel according to claim 1, wherein said water-repellent ring comprises a rolled strip having a length substantially identical to one of an inner circumference of said outer annular member and an outer circumference of said inner annular member to which said water-repellent ring is fixed.

5. The weather-sealing structure of a lens barrel according to claim 4, wherein positions in an optical axis direction of front and rear ends of each end of said rolled strip of said water-repellent ring are different in a circumferential direction of said water-repellent ring.

6. The weather-sealing structure of a lens barrel according to claim 5, wherein each of said ends of said rolled strip comprises:
   a first edge which extends toward a rear edge of said strip from a front edge of said strip;
   a second edge which extends toward said front edge of said strip from said rear edge of said strip at a position different from a position of said first edge in said circumferential direction of said water-repellent ring; and
   a connecting portion which extends in a direction different from either of two directions in which said first edge and said second edge extend, respectively, and connects said first edge and said second edge to each other.

7. The weather-sealing structure of a lens barrel according to claim 6, wherein said connecting portion extends straight in said circumferential direction of said water-repellent ring.

8. The weather-sealing structure of a lens barrel according to claim 6, wherein said connecting portion extends obliquely with respect to said circumferential direction of said water-repellent ring.

9. The weather-sealing structure of a lens barrel according to claim 6, wherein said connecting portion is curved with respect to said circumferential direction of said water-repellent ring.

10. The weather-sealing structure of a lens barrel according to claim 1, wherein said synthetic leather that is impregnated with said water repellent is shaped into a rolled strip to form said water-repellent ring.

11. The weather-sealing structure of a lens barrel according to claim 1, wherein said lens barrel comprises a plurality of movable lens groups which are moved relative to each other along an optical axis to perform a zooming operation.

12. The weather-sealing structure of a lens barrel according to claim 1, wherein an annular recessed portion, in which said water-repellent ring is received to be fixed thereto, comprises one of said inner peripheral surface of said outer annular member and said outer peripheral surface of said inner annular member, to which said water-repellent ring is fixed.

13. The weather-sealing structure of a lens barrel according to claim 1 wherein a water trap is provided between the end surfaces of said water repellent ring.

14. A weather-sealing structure of a telescoping type of lens barrel, comprising at least two radially-adjacent concentric barrels, at least one of which moves relative to the other, and a water-repellent ring, wherein said water-repellent ring comprises synthetic leather which is impregnated with a water repellent and installed between radially-adjacent peripheral surfaces of said radially-adjacent concentric barrels, fine hairs being densely implanted into one of inner and outer peripheral surfaces of said water-repellent ring, and wherein the other of said inner and outer peripheral surfaces of said water-repellent ring is fixed to one of said radially-adjacent peripheral surfaces of said radially-adjacent concentric barrels so that said one of said inner and outer peripheral surfaces of said water-repellent ring, into which said fine hairs are implanted, is in sliding contact with the other of said radially-adjacent peripheral surfaces of said radially-adjacent concentric barrels.

15. The weather-sealing structure of a telescoping type of lens barrel according to claim 14, wherein said water-repellent ring comprises a rolled strip having a length substantially identical to said radially-adjacent peripheral surfaces of said radially-adjacent concentric barrels.

16. The weather-sealing structure of a telescoping type of lens barrel according to claim 15, wherein positions in an optical axis direction of front and rear ends of each end of said rolled strip of said water-repellent ring are different in a circumferential direction of said water-repellent ring.

17. The weather-sealing structure of a telescoping type of lens barrel according to claim 16, wherein each of said ends of said rolled strip comprises:

a first edge which extends toward a rear edge of said strip from a front edge of said strip;

a second edge which extends toward said front edge of said strip from said rear edge of said strip at a position different from a position of said first edge in said circumferential direction of said water-repellent ring; and a connecting portion which extends in a direction different from either of two directions in which said first edge and said second edge extend, respectively, and connects said first edge and said second edge to each other.

18. The weather-sealing structure of a telescoping type of lens barrel according to claim 14 wherein said water-repellent ring is opaque.

19. The weather-sealing structure of a telescoping type of lens barrel according to claim 14 wherein a water trap is provided between the end surfaces of said water repellent ring.

* * * * *